April 5, 1927.
W. C. WERST
1,623,324
DOORKNOB SPINDLE
Filed Feb. 4, 1924
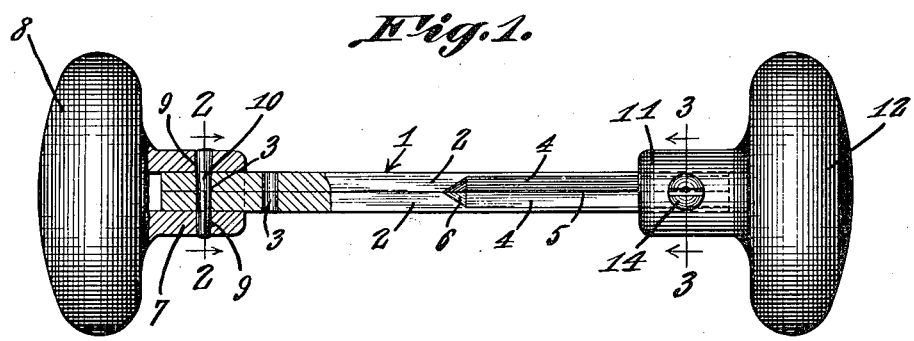
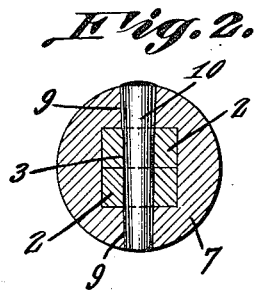
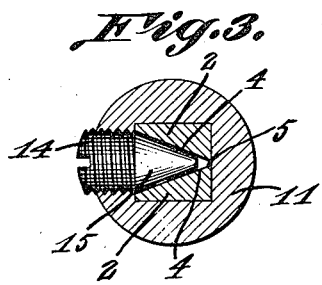
W. C. Werst, Inventor
By C. A. Snow & Co.
Attorney Patented Apr. 5, 1927.

1,623,324

UNITED STATES PATENT OFFICE.

WILLARD C. WERST, OF PENDLETON, OREGON.

DOORKNOB SPINDLE.

Application filed February 4, 1924. Serial No. 690,526.

This invention aims to provide a novel and inexpensive door knob spindle; and to provide novel and inexpensive means for holding the knobs on the spindle, one knob being readily adjustable longitudinally of the spindle.

In the drawings:—

Figure 1 is an elevation wherein parts are in section;

Figure 2 is a section on the line 2—2 of Figure 1;

Figure 3 is a section on the line 3—3 of Figure 1.

The spindle 1 is made up of a pair of bars 2 of rectangular cross section, the bars being provided adjacent to one end with registering cylindrical openings 3. At their opposite ends, the bars 2 are supplied with cooperating inclined surfaces 4 defining a V-shaped groove 5 extended longitudinally of the spindle 1 and terminated, as indicated at 6, at a point about midway between the ends of the spindle 1.

One end of the spindle 1 is received in the neck 7 of a knob 8, the neck 7 having a tapered bore 9 adapted to be alined with the cylindrical openings 3 in the bars 2 of the spindle 1. A tapered pin is driven into the bore 9 of the neck 7 and through the openings 3 of the spindle bars 2, and because the openings 3 are of cylindrical form, the pin 10 will be wedged in the spindle and be held securedly therein.

That end of the spindle 1, which is remote from the knob 8 is received in the neck 11 of a knob 12. A screw 14 is threaded into the neck 11 and has a conical end 15 which, cooperating with the inclined surfaces 4 of the spindle bars 2, spreads the bars apart and causes them to bind in the neck 11 of the knob 12. When the screw 14 is loosened, the knob 12 may be slid inwardly and outwardly on the spindle 1, for adjustment, the end 15 of the screw riding in the V-shaped groove 5 of the spindle 1. In this way, a much finer adjustment can be secured than is possible when the screw is received in holes spaced apart longitudinally of the spindle, and because the ends of the bars 2 are forced apart transversely by the conical end 15 of the screw 14, and are caused to grip the neck 11 of the knob 12, the knob is held in place more securely than is the case when a set screw in the neck 11 merely bears at its inner end against a solid one-piece spindle.

I claim:

In a device of the class described, a spindle made up of bars located side by side, knobs receiving the ends of the spindle, a smooth tapered pin in one knob, the bars having alined cylindrical openings located entirely within the contour of the respective bars, the pin being wedged and distorted to cylindrical form in the openings and throughout the combined width of both bars, and a screw threaded into the other knob and having a conical end, the bars having transversely inclined surfaces defining a V-shaped groove wherein the conical end of the screw is wedged, the screw and the pin being located at right angles to each other.

In testimony that I claim the foregoing as my own, I have hereto affixed my signature.

WILLARD C. WERST.